United States Patent
Choi et al.

(10) Patent No.: US 10,741,881 B2
(45) Date of Patent: Aug. 11, 2020

(54) SECONDARY BATTERY

(71) Applicant: LG Chem, Ltd., Seoul (KR)

(72) Inventors: Soon Hyung Choi, Daejeon (KR); Su Rim Lee, Daejeon (KR); Song Taek Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/078,436

(22) PCT Filed: Sep. 18, 2017

(86) PCT No.: PCT/KR2017/010209
§ 371 (c)(1),
(2) Date: Aug. 21, 2018

(87) PCT Pub. No.: WO2018/105863
PCT Pub. Date: Jun. 14, 2018

(65) Prior Publication Data
US 2020/0127338 A1   Apr. 23, 2020

(30) Foreign Application Priority Data
Dec. 6, 2016  (KR) .................. 10-2016-0165063

(51) Int. Cl.
*H01M 10/42* (2006.01)
*H01M 10/0525* (2010.01)
(Continued)

(52) U.S. Cl.
CPC ..... *H01M 10/4235* (2013.01); *H01M 2/0285* (2013.01); *H01M 2/0287* (2013.01); *H01M 2/32* (2013.01); *H01M 10/0525* (2013.01)

(58) Field of Classification Search
None
See application file for complete search history.

(56) References Cited

U.S. PATENT DOCUMENTS

2009/0208835 A1   8/2009  Horiuchi et al.
2012/0258341 A1   10/2012 Ahn

FOREIGN PATENT DOCUMENTS

EP   2851972 A1    3/2015
JP   H02039175 Y2  10/1990
(Continued)

OTHER PUBLICATIONS

Extended European Search Report including Written Opinion for Application No. EP17878937.6 dated Nov. 29, 2018.
(Continued)

*Primary Examiner* — Sarah A. Slifka
(74) *Attorney, Agent, or Firm* — Lerner, David, Littenberg, Krumholz & Mentlik, LLP

(57) ABSTRACT

The secondary battery includes a case in which a positive electrode lead and a negative electrode lead are provided, wherein the case includes an external layer exposed to the outside, an insulation layer disposed in the case and insulated, a conductive layer stacked between the external layer and the insulation layer, made of a conductive material, and having one side coming into contact with the positive electrode lead and the other side coming into contact with the negative electrode lead, and a safety member disposed at a center of the conductive layer to prevent electricity from flowing through the conductive layer at a predetermined temperature or less and melted at the predetermined temperature or more to allow the electricity to flow through the conductive layer.

9 Claims, 5 Drawing Sheets

(51) Int. Cl.
*H01M 2/02* (2006.01)
*H01M 2/32* (2006.01)

(56) References Cited

FOREIGN PATENT DOCUMENTS

| | | |
|---|---|---|
| JP | H05057794 U | 7/1993 |
| JP | 2006185710 A | 7/2006 |
| JP | 2008130458 A | 6/2008 |
| JP | 2009193815 A | 8/2009 |
| JP | 2014022283 A | 2/2014 |
| JP | 2016126880 A | 7/2016 |
| KR | 101128667 B1 | 3/2012 |
| KR | 20140004305 A | 1/2014 |
| KR | 20150038931 A | 4/2015 |
| KR | 20160120089 A | 10/2016 |

OTHER PUBLICATIONS

Search report from International Application No. PCT/KR2017/010209, dated Dec. 12, 2017.

SECONDARY BATTERY

CROSS-REFERENCE TO RELATED APPLICATION

The present application is a national phase entry under 35 U.S.C. § 371 of International Patent Application No. PCT/KR2017/010209, filed on Sep. 18, 2017, published in Korean, which claims priority from Korean Patent Application No. 10-2016-0165063, filed on Dec. 6, 2016, the disclosures of which are hereby incorporated herein by reference.

TECHNICAL FIELD

The present invention relates to a secondary battery, and more particularly, to a secondary battery that is capable of preventing the battery from being ignited when the battery is exposed to an abnormal high temperature.

BACKGROUND ART

Batteries (cells) that generate electric power through physical or chemical reaction to supply the generated power to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A pouch type secondary battery and a method for sealing a pouch are disclosed in Korea Patent Publication No. 10-2014-0004305.

According to the related art, a pouch for a secondary battery is manufactured by sequentially stacking an exterior, aluminum (Al), and an interior.

However, the pouch for the secondary battery has a problem that the more a degree of charging increases, the more thermal stability decreases.

That is, when the battery is verified through a thermal safety test, if the charged battery (SOC 100) is exposed to a temperature higher than room temperature, a thermal runaway phenomenon may occur to cause ignition of the battery.

Particularly, a pouch type battery which does not include a safety mechanism such as a positive temperature coefficient (PTC) or a low-voltage current interrupt device (CID) has a problem that such a phenomenon easily occurs.

DISCLOSURE OF THE INVENTION

Technical Problem

Therefore, the present invention has been made to solve the abovementioned problem, and an object of the present invention is to provide a secondary battery that is capable of reducing total energy contained in the battery at a predetermined temperature to prevent the battery from being ignited.

Technical Solution

A secondary battery according to an embodiment of the present invention includes a case in which a positive electrode lead and a negative electrode lead are provided, wherein the case includes an external layer exposed to the outside, an insulation layer disposed in the case and insulated, a conductive layer stacked between the external layer and the insulation layer, made of a conductive material, and having one side coming into contact with the positive electrode lead and the other side coming into contact with the negative electrode lead, and a safety member disposed at a center of the conductive layer to prevent electricity from flowing through the conductive layer at a predetermined temperature or less and melted at the predetermined temperature or more to allow the electricity to flow through the conductive layer.

The external layer may be made of a nylon material, the insulation layer may be made of a polymer material, the conductive layer may be made of an aluminum material, and the safety member may be made of polyethylene (PE).

At least a portion of the insulation layer between the conductive layer and the positive electrode lead may be removed.

At least a portion of the insulation layer between the conductive layer and the negative electrode lead may be removed.

The predetermined temperature may be 120° C. or more.

When the safety member is melted, the electricity may flow between the positive electrode lead and the negative electrode lead by using the conductive layer as a medium.

The conductive layer may be partitioned from a conductive layer exclusion portion by the insulation layer to prevent the electricity from flowing to the conductive layer exclusion portion.

The conductive layer may include a positive electrode conductive layer coming into contact with the positive electrode lead and a negative electrode conductive layer coming into contact with the negative electrode lead, wherein the safety member may be disposed on portions at which the positive electrode conductive layer and the negative electrode conductive layer overlap each other.

When the safety member is melted at a predetermined temperature, the portions at which the positive electrode conductive layer and the negative electrode conductive layer overlap each other come into contact with each other.

Advantageous Effects

According to the present invention, the positive electrode and the negative electrode may be short-circuited with each other at a predetermined temperature to prevent the battery from being ignited.

According to the present invention, the positive electrode and the negative electrode may be short-circuited with each other through the conductive layer of the pouch while the safety member is fused at a predetermined temperature to more lower a degree of the charging of the battery, thereby improving the safety.

According to the present invention, when the positive electrode and the negative electrode are short-circuited with each other, the electricity may be induced to flow through only the conductive layer by the insulator, thereby securing the safety.

MODE FOR CARRYING OUT THE INVENTION

Figure 1:
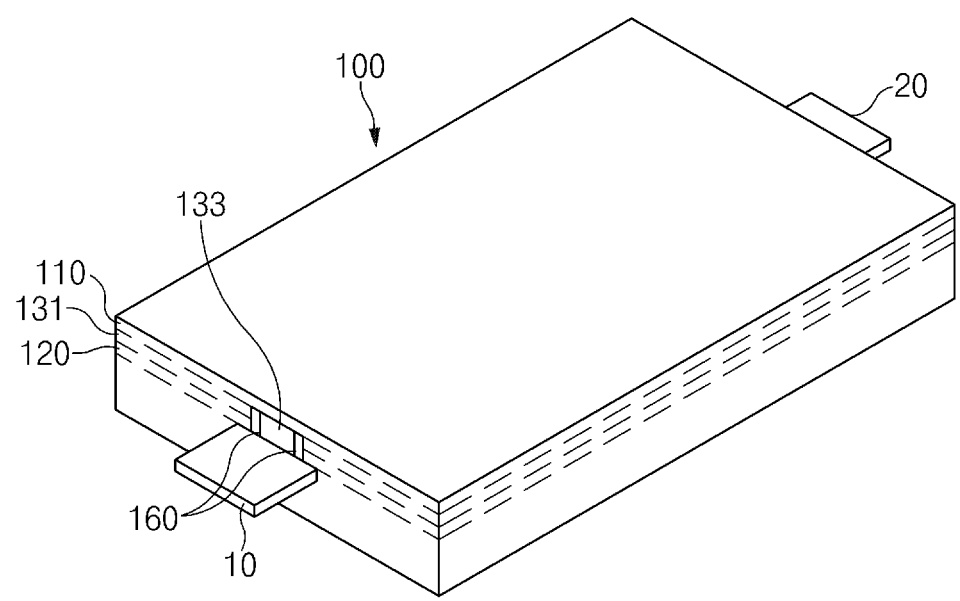
FIG. 1 is a perspective view of a secondary battery according to an embodiment of the present invention.

Hereinafter, a secondary battery according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
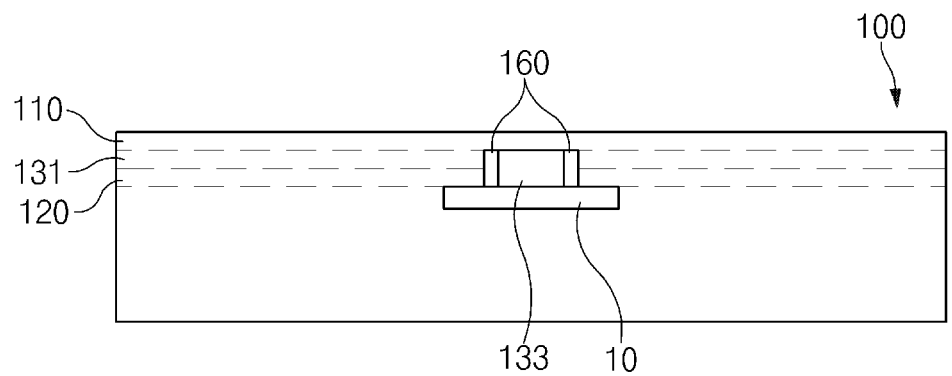
FIG. 2 is a front view of FIG. 1.
Figure 3:
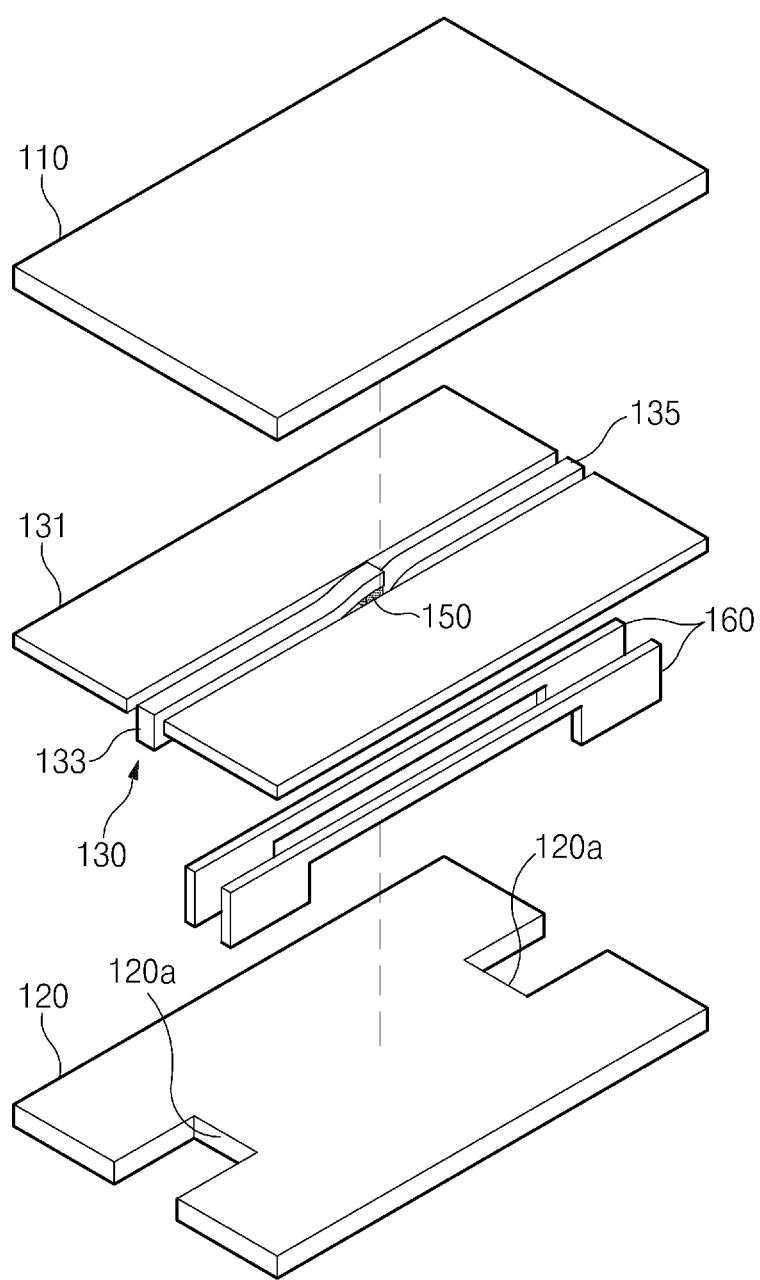
FIG. 3 is an exploded perspective view of only one surface of a pouch in the secondary battery according to an embodiment of the present invention.

FIG. 1 is a perspective view of a secondary battery according to an embodiment of the present invention, FIG. 2 is a front view of FIG. 1, and FIG. 3 is an exploded perspective view of only one surface of a pouch in the secondary battery according to an embodiment of the present invention.

Referring to FIGS. 1 to 3, a secondary battery in accordance with an exemplary embodiment includes a case 100 in which a positive electrode lead 10 and a negative electrode lead 20 are provided, and the case 100 includes an external layer 110 exposed to the outside, an insulation layer 120 disposed in the case 100 and insulated, a conductive layer (130) stacked between the external layer 110 and the insulation layer 120, made of a conductive material, and having one side coming into contact with the positive electrode lead 10 and the other side coming into contact with the negative electrode lead 20, and a safety member 150 disposed at a center of the conductive layer 130 to prevent electricity from flowing through the conductive layer 130 at a predetermined temperature or less and melted at the predetermined temperature or more to allow the electricity to flow through the conductive layer 130.

The case 100 may be a pouch accommodating an electrolyte and an electrode assembly.

The electrode assembly may be manufactured by stacking a positive electrode coated with a positive electrode active material, a negative electrode coated with a negative electrode active material, and a separator disposed between the positive electrode and the negative electrode several times.

Also, the electrode assembly may be manufactured by winding the stack, in which the positive electrode, the separator, and the negative electrode are stacked, in a jelly-roll shape.

The positive electrode may be an aluminum plate and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be formed, for example, by applying the positive electrode active material to a portion of at least one surface of the aluminum plate, and the remaining portion of the aluminum plate, which is not coated with the positive electrode active material, may be the positive electrode non-coating portion.

A positive electrode tab may be attached to the positive electrode non-coating portion, and the positive electrode lead 10 may be electrically connected to the positive electrode tab.

The negative electrode may be a copper plate and include a negative electrode coating portion coated with the negative electrode active material and a negative electrode non-coating portion which is not coated with the negative electrode active material.

A negative electrode tab may be attached to the negative electrode non-coating portion, and the negative electrode lead 20 may be electrically connected to the negative electrode tab.

The negative electrode active material may be a carbon material such as crystalline carbon, amorphous carbon, a carbon composite, and a carbon fiber, a lithium metal, or a lithium alloy.

The negative electrode coating portion may be formed, for example, by applying the negative electrode active material to a portion of at least one surface of the copper plate, and the remaining portion of the copper plate, which is not coated with the negative electrode active material, may be the negative electrode non-coating portion.

The separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

The electrolyte may allow lithium ions to smoothly move in the electrode assembly. For example, the electrolyte may include a non-aqueous organic solvent and lithium salts.

The lithium salts may be dissolved in the organic solvent to act as a supply source of the lithium ions in the secondary battery and promote the movement of the lithium ions between the positive electrode and the negative electrode.

Examples of the lithium salts may include electrolytic salts that support one or more materials of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)$ $(C_yF_{2y+1}SO_2)$ (where x and y are natural numbers), LiCl, LiI, lithium bisoxalate borate, and the like.

The lithium salts in the electrolyte may vary in concentration according to a use thereof and may be generally used within a range of 0.1M to 2.0M.

Also, the organic solvent serves as a medium through which ions involved in electrochemical reaction of the battery move. Exemplary examples of the organic solvent may include one or more kinds of materials selected from benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a straight, branched, or cyclic hydrocarbon group having 2 to 50 carbon atoms, wherein the hydrocarbon group includes a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methyl propyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, gamma-butyrolactone, sulfolane, valerolactone, decanolide, and mevalolactone, but are not limited thereto.

The case 100 includes an external layer 110 exposed to the outside to protect the electrolyte and the electrode assembly, which are accommodated in the case 100, against external environments, an insulation layer 120 insulating the electrode assembly from the case 100 while preventing the electrolyte and the electrode assembly, which are accommodated in the case 100, from leaking or exposed to the outside, a conductive layer 130 stacked between the external layer 110 and the insulation layer 120 and made of an insulation material; and a conductive layer exclusion portion 131, which is partitioned from the conductive layer 130 by the insulation layer 160, made of the same material as the conductive layer 130, and stacked between the external layer 110 and the insulation layer 120.

In FIGS. 1 and 2, the external layer 110, the conductive layer exclusion portion 131, and the insulation layer 120 are divided by dotted lines.

The external layer 110 may be preferably made of a material having high durability to protect the electrolyte and the electrode assembly 1 against the external environments. For example, the external layer 110 may be made of a nylon material.

The internal layer 120 may be preferably made of a material having high insulation so that the internal layer 120 is not deformed or chemically changed in a state in which the internal layer 120 comes into direct contact with the electrolyte accommodated in the case 100. For example, the internal layer 120 may be made of a polymer material.

The conductive layer 130 may be disposed between the external layer 110 and the internal layer 120 and be preferably made of a material having electrical conductivity while having high durability and heat resistance. For example, the conductive layer 130 may be made of an aluminum (Al) material.

Also, the conductive layer 130 may come into electrical contact with each of the positive electrode lead 10 and the negative electrode lead 20 of the electrode assembly accommodated in the case 100.

Also, a cutoff part 120a that cuts each of the insulation layer 120 disposed between the conductive layer 130 and the positive electrode lead 10 and the insulation layer 120 disposed between the conductive layer 30 and the negative electrode lead 20 may be provided so that the conductive layer 130 comes into contact with each of the positive electrode lead 10 and the negative electrode lead 20. Here, the conductive layer 130 may extend through the cutoff part 120a to electrically connect the positive electrode lead 10 to the negative electrode lead 20.

That is, the cutoff layer may be manufactured by removing at least a portion of the insulation layer 120 between the conductive layer 130 and the positive electrode lead 10 and at least a portion of the insulation layer 120 between the conductive layer 130 and the negative electrode lead 20.

Also, to prevent the electricity flowing through the conductive layer 130 from flowing to the conductive layer exclusion portion 131 to flow the entire secondary battery, an insulator 160 may be disposed between the conductive layer 130 and the conductive layer exclusion portion 131 to prevent the electricity from flowing from the conductive layer 130 to the conductive layer exclusion portion 131.

That is, the insulator 160 made of a resin material having the electrical insulation may be disposed on each of both sides of the conductive layer 130 to induce the electricity so that the electricity flows along only the conductive layer 130.

Also, the safety member 150 may be disposed at the center of the conductive layer 130 to usually prevent the electricity from flowing through the conductive layer 130 coming into electrical contact with the positive electrode lead 10 and the negative electrode lead 20.

The safety member 150 may be made of polyethylene (PE) that is an insulation material to usually prevent the electricity from flowing through the conductive layer 130 and be melted at a predetermined temperature defined to a temperature of 120° C. or more.

That is, the safety member 150 may be melted at a specific temperature or more, which becomes a reference temperature defined to a temperature of 120° C. or more.

Also, when the safety member 150 disposed at the center of the conductive layer 130 is melted, the center of the conductive layer 130 may be connected to allow the electricity to flow through the conductive layer 130.

As described above, even through the secondary batter is under the high-temperature environments, the positive electrode and the negative electrode of the secondary battery may be short-circuited with each other by using the conductive layer 130 as a medium to reduce the total energy, thereby preventing the secondary battery from being ignited.

Here, the short circuit between the positive electrode and the negative electrode may significantly reduce a state of charging (SOC) of the battery, and thus, the total energy may be reduced to prevent thermal runaway or ignition from occurring.

Figure 4:
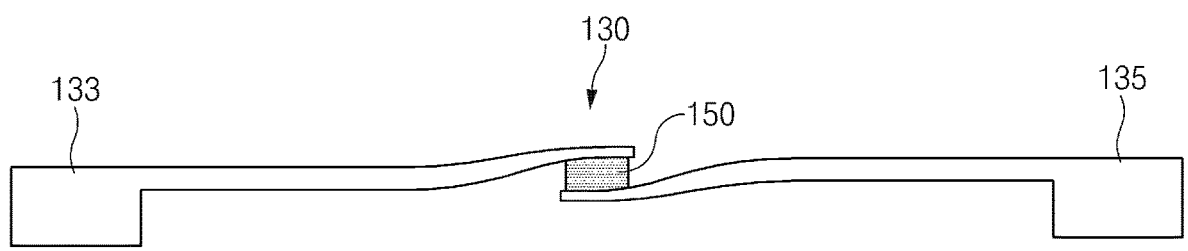
FIG. 4 is a side view of only a conductive layer according to an embodiment of the present invention.

FIG. 4 is a side view of only a conductive layer according to an embodiment of the present invention.

As illustrated in FIG. 4, the conductive layer 130 may include a positive electrode conductive layer 133 coming into contact with the positive electrode lead 10 and a negative electrode conductive layer 135 coming into contact with the negative electrode lead 20.

Also, the safety member 150 may be disposed on portions at which the positive electrode conductive layer 133 and the negative electrode conductive layer 135 overlap each other to usually prevent the positive electrode conductive layer 133 and the negative electrode conductive layer 135 from electrically coming into contact with each other.

Figure 5:
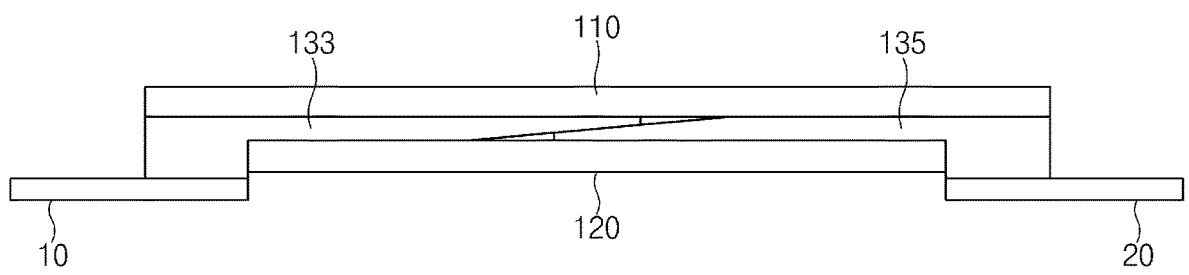
FIG. 5 is a use state view of a case in which a safety member is fused to allow the conductive layer to be short-circuited according to an embodiment of the present invention.

FIG. 5 is a use state view of a case in which the safety member is fused to allow the conductive layer to be short-circuited according to an embodiment of the present invention.

As illustrated in FIG. 5, when the safety member 150 is melted at a temperature of 120° C. or more, the portions at which the positive electrode conductive layer 133 and the negative electrode conductive layer 135 overlap each other may be closely attached to each other, and thus, the positive electrode lead 10 and the negative electrode lead 20 may be electrically connected to each other through the conductive layer 130.

Also, when the positive electrode lead 10 and the negative electrode lead 20 are electrically connected to each other to allow electricity to flow therethrough, the state of charging (SOC) of the secondary battery may be reduced to prevent the secondary battery from being ignited.

As described above, according to the present invention, the positive electrode and the negative electrode may be short-circuited with each other at a predetermined temperature to prevent the battery from being ignited.

Also, according to the present invention, the positive electrode and the negative electrode may be short-circuited with each other through the conductive layer of the pouch while the safety member is fused at a predetermined temperature to more lower a degree of the charging of the battery, thereby improving the safety.

Also, according to the present invention, when the positive electrode and the negative electrode are short-circuited with each other, the electricity may be induced to flow through only the conductive layer by the insulator, thereby securing the safety.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:
a case in which a positive electrode lead and a negative electrode lead are provided,
wherein the case comprises:
an external layer exposed to the outside;
an insulation layer disposed in the case and insulated;
a conductive layer stacked between the external layer and the insulation layer, made of a conductive material, and having one side coming into contact with the positive electrode lead and the other side coming into contact with the negative electrode lead; and
a safety member disposed at a center of the conductive layer to prevent electricity from flowing through the conductive layer at a predetermined temperature or less and melted at the predetermined temperature or more to allow the electricity to flow through the conductive layer.

2. The secondary battery of claim 1, wherein the external layer is made of a nylon material, the insulation layer is made of a polymer material, the conductive layer is made of an aluminum material, and the safety member is made of polyethylene (PE).

3. The secondary battery of claim 1, wherein at least a portion of the insulation layer between the conductive layer and the positive electrode lead is removed.

4. The secondary battery of claim 1, wherein at least a portion of the insulation layer between the conductive layer and the negative electrode lead is removed.

5. The secondary battery of claim 1, wherein the predetermined temperature is 120° C. or more.

6. The secondary battery of claim 1, wherein, when the safety member is melted, the electricity flows between the positive electrode lead and the negative electrode lead by using the conductive layer as a medium.

7. The secondary battery of claim 6, wherein the conductive layer is partitioned from a conductive layer exclusion portion by the insulation layer to prevent the electricity from flowing to the conductive layer exclusion portion.

8. The secondary battery of claim 1, wherein the conductive layer comprises:
a positive electrode conductive layer coming into contact with the positive electrode lead; and
a negative electrode conductive layer coming into contact with the negative electrode lead,
wherein the safety member is disposed on portions at which the positive electrode conductive layer and the negative electrode conductive layer overlap each other.

9. The secondary battery of claim 8, wherein, when the safety member is melted at a predetermined temperature, the portions at which the positive electrode conductive layer and the negative electrode conductive layer overlap each other come into contact with each other.

* * * * *